Dec. 8, 1959     R. E. BRUMBACH     2,916,055
EXTRUDED TUBING SHEATH

Filed May 9, 1955                         2 Sheets—Sheet 1

INVENTOR.
ROBERT E. BRUMBACH
BY Bates, Teare + Mc Bean
ATTORNEYS

Dec. 8, 1959   R. E. BRUMBACH   2,916,055
EXTRUDED TUBING SHEATH
Filed May 9, 1955   2 Sheets-Sheet 2

INVENTOR.
ROBERT E. BRUMBACH
BY
Bates, Teare & McBean
ATTORNEYS

United States Patent Office

2,916,055
Patented Dec. 8, 1959

2,916,055

EXTRUDED TUBING SHEATH

Robert E. Brumbach, Mantua, Ohio, assignor to Samuel Moore & Company, Mantua, Ohio, a corporation of Ohio Application May 9, 1955, Serial No. 506,926

1 Claim. (Cl. 138—87)

This invention relates to a protective sheath for tubing and the like, and more particularly relates to the provision of a protective sheath for containing a plurality of tubes in a prearranged assembly which permits separation of one or more tubes from the assembly while still encased in a self-contained sheath.

In many applications of hollow tubing, such as air line instrument tubing, it is desired to maintain a plurality of rigid or flexible tubes in some predetermined physical relation to each other and also to protect the tubing from damage in use and handling. This can be accomplished, for example, by extruding a protective sheath onto the tubing assembly arranged according to the desired physical configuration so that the entire assembly is encased in a relatively fixed position in accordance with that configuration. The sheath material may be such as to prevent adhesion between the sheath and the tubing to permit exposure of the extremities of the sheathed tubes for making connections. Tubing thus encased may be employed for carrying gases, fluids and even electrical energy.

In many instances, it may be desired to use one or more less than the entire tubing assembly in a different location or at least in a different physical position than that determined by the protective sheath, and it is one of the principal objects of this invention to provide a protective sheath for a plurality of tubes from which one or more tubes may be separated in part or in whole and still remain encased in a self-containing sheath.

A further object of this invention is the provision of a method for covering a plurality of tubes arranged in a predetermined physical assembly with a plastic sheath in a manner that will permit selective separation of one or more of the tubes which will remain encased in a self-contained sheath that originally formed a portion of the over-all protective sheath.

A still further object of this invention is the provision of a protective sheath for a plurality of tubes where each tube is individually encased in a self-contained sheath and these are separably connected together to form a prearranged assembly of a plurality of tubes encased in a unitary protective sheath.

Another object of this invention is the provision of a transparent protective sheath for a plurality of color coded tubes from which one or more tubes may be easily identified and separated in part or in whole and still remain encased in a self-contained shealth.

Briefly, in accordance with this invention, a plurality of tubes disposed in parallel relation to each other receive an extruded coating of protective material which individually encases each of the tubes and integrally connects the individual adjoining tube sheaths with an interconnecting web. After the extruded sheath has set, the webs are perforated in the direction of the tubing to aid separation of adjacent encased tubes along the joining web. The tubes may be color coded and the sheath transparent to permit easy identification and selection of particular tubes.

Figure 1:
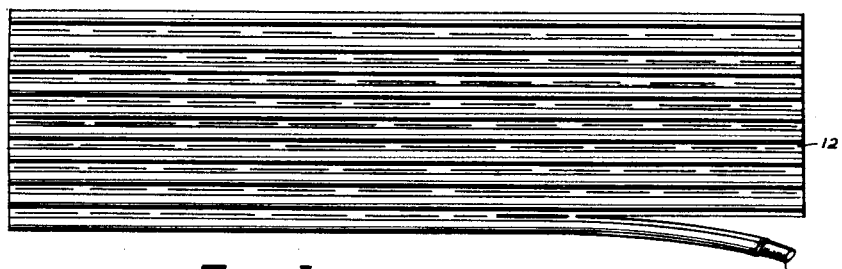
Fig. 1 is a plan view of a plurality of parallel tubes encased in the protective sheath of this invention and illustrates the partial separation of one of the self-contained sheathed tubes.
Figure 2:
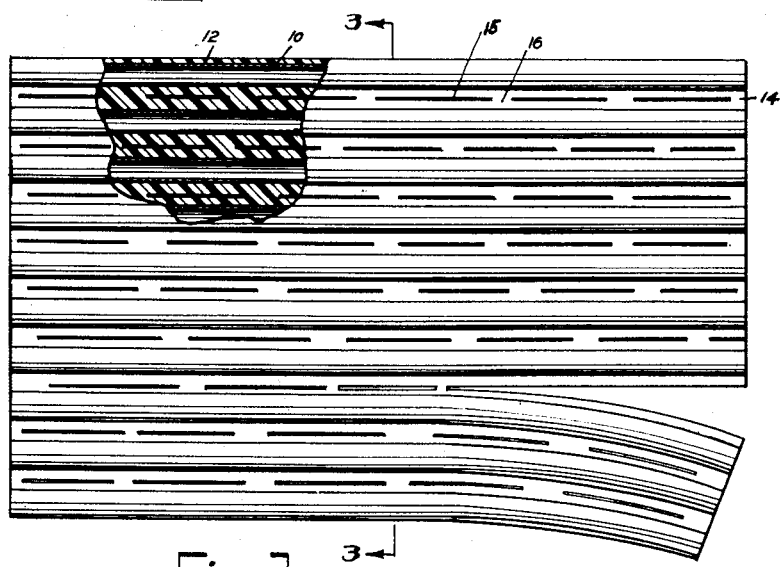
Fig. 2 is an enlarged plan view of a sheathed tubing assembly illustrating in partial section the internal construction of the encased assembly.
Figure 5:
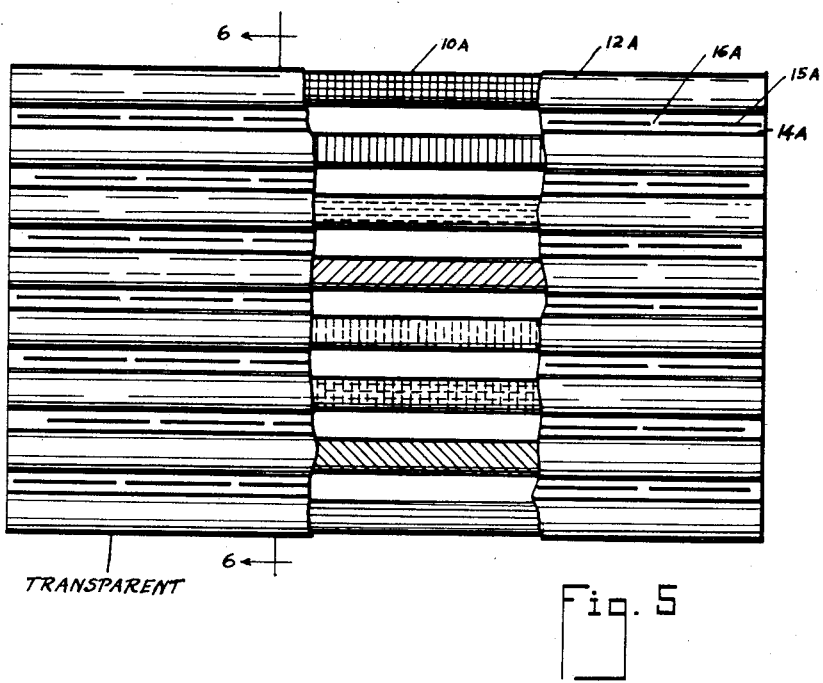
Fig. 5 is a plan view of color coded tubing encased in a transparent sheath in accordance with this invention.
Figure 6:
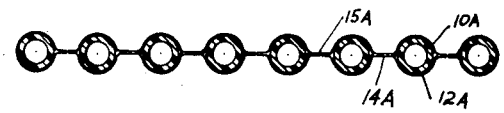
Fig. 6 is a view taken along the line 6—6 in Fig. 5.

Referring now more particularly to Figs. 1 and 2 of the drawings, it is seen that a plurality of tubes 10, which may be rigid or flexible, are assembled in juxtaposed parallel relation in a common plane and the assembly encased within a protective sheath 12. The sheath 12 may be made from any extrudable material which, preferably, will not adhere to the tubes 10. This permits the sheath 12 to be slid or peeled back at the ends to facilitate making end connections and is highly desirable, since the use of a knife or other sharp cutting instrument to expose the ends of an encased tube would endanger the sheath 12 and deprive the tubing assembly of its protection. By way of example, I have found that an elastomeric vinyl plastic material is suitable for copper, aluminum or plastic tubes. However, polyethylene and other types of extrudable materials may also be used with satisfactory results. The sheath may be opaque or, as shown at 12A in Figs. 5 and 6 of the drawings, may be transparent to permit visual identification of color coded tubes without stripping the sheath. Each of tubes 10A is shown lined for a different color which is easily visible through the transparent sheath 12A.

Figure 3:
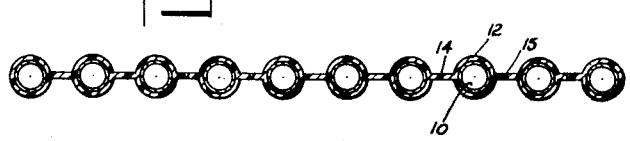
Fig. 3 is a view taken along the lines 3—3 in Fig. 2 of the drawings.
Figure 4:
Fig. 4 is an enlarged view of one of the interconnecting webs of the sheathed tubing assembly shown in Fig. 3.

Since the sheath 12 is preferably extruded onto the tubing assembly in a relatively thin envelope it will follow substantially the contours of the tubing and take the form shown in cross section in Fig. 3 of the drawings. As a result, each of the tubes 10 is individually encased in the sheath material and joined to its adjacent tube through the medium of a relatively thin web 14 of sheath material. After the extruded sheath material has set, the encased tubing assembly may be used as a unit in a tubing system or, as is often the case, one or more of the tubes 10 may be separated in part or in whole from the assembly by severing the protective sheath 12 along the thin web 14 which joins the tube or tubes to be separated to the tubing assembly. In order to assist this separation and assure that the parting line follows the thin joining web 14 rather than damaging the individual tube sheath, perforations are pierced through the webs 14 along the line of intended separation. The separation will then follow the line of least resistance provided by the perforations as shown in Figs. 1 and 3. As shown, the perforations are preferably in the form of elongated slots 15 separated by short connecting teeth or fins 16.

In actual practice, the extrusion of the sheath 12 on the tubing assembly and the perforations of the connecting webs 14 may all be a part of a continuous process; the end result being a plurality of juxtaposed parallel tubes 10 individually encased in a protective sheath each of which is interconnected to form a unitary enveloping sheath 12. Individual tubes or groups of tubes lesser than the whole may be separated from the encased tubing assembly simply by severing a line of interconnecting fins 16 formed by perforations 15 in the joining webs 14. It will be readily apparent that regardless of whether the tubes 10 are rigid or flexible the enveloping protective sheath 12 can be flexed in a direction transverse to the tube axes because of the relatively thin interconnecting webs 14.

I have shown and described what I consider to be the preferred embodiment of my invention along with suggested modifications, and it will be obvious to those skilled in the art that other changes and modifications may be made without departing from the scope of this invention as defined by the appended claim.

I claim:

A tubing assembly for use as instrument tubing and the like comprising a plurality of longitudinally extending juxtaposed tubes disposed in a predetermined spaced parallel relation and having a flexible plastic envelope covering the tubes and forming a sheath individually and separably encasing each tube, said sheath including integral planar web-like portions interconnecting in a transverse direction the tube encasing portions of said sheath and dimensioned to maintain such predetermined spaced relationship between the tubes, said sheath extending longitudinally between adjacent tubes the full lengthwise extent of the latter, the external diameter of each of said tubes being considerably greater than the thickness in a vertical direction of each of said planar web-like portions and with the transverse width of each of said web-like portions being considerably greater than said thickness, each of said web-like portions having elongated perforations disposed in a line parallel to the tube axes and in laterally spaced relation with respect to the external peripheries of adjacent tube encasing portions of said sheath, said perforations being separated by relatively short connecting fins of the sheath material, whereby the tubing assembly may be readily flexed to displace the axes of the tubes from a common plane and whereby separation of one or more individually encased tubes from the unitary envelope may be easily accomplished and without damage to the tube encasing portions of said sheath.

References Cited in the file of this patent

UNITED STATES PATENTS

| | | |
|---|---|---|
| 639,605 | Nordlinger | Dec. 19, 1899 |
| 2,136,230 | Berman et al. | Nov. 8, 1938 |
| 2,232,085 | Troche | Feb. 18, 1941 |
| 2,236,171 | Garretson | March 24, 1941 |
| 2,624,366 | Pugh | Jan. 6, 1953 |
| 2,626,303 | Link | Jan. 20, 1953 |
| 2,628,998 | Frisbie | Feb. 17, 1953 |